United States Patent
Jason (10) Patent No.: US 11,810,339 B2
(45) Date of Patent: *Nov. 7, 2023

(54) NEURAL NETWORK HOST PLATFORM FOR DETECTING ANOMALIES IN CYBERSECURITY MODULES

(71) Applicant: Proofpoint, Inc., Sunnyvale, CA (US)

(72) Inventor: Adam Jason, Zelienople, PA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,740

(22) Filed: May 10, 2022

(65) Prior Publication Data

US 2022/0269911 A1    Aug. 25, 2022

Related U.S. Application Data

(63) Continuation of application No. 17/038,727, filed on Sep. 30, 2020, now Pat. No. 11,361,198.

(Continued)

(51) Int. Cl.
*G06K 9/62* (2022.01)
*G06N 3/02* (2006.01)
(Continued)

(52) U.S. Cl.
CPC ...... *G06V 10/7784* (2022.01); *G06F 18/2148* (2023.01); *G06F 18/2185* (2023.01);
(Continued)

(58) Field of Classification Search
CPC .. G06K 9/6284; G06K 9/6257; G06K 9/6264; G06N 3/02; H04L 63/14
See application file for complete search history.

(56) References Cited

U.S. PATENT DOCUMENTS

| | | | |
|---|---|---|---|
| 2005/0108619 A1* | 5/2005 | Theall | G06F 16/48 715/255 |
| 2012/0151309 A1* | 6/2012 | Bastide | G06F 40/186 715/202 |

(Continued)

OTHER PUBLICATIONS

Sarajanovic-Djukic et al, "Fast Distance-based Anomaly Detection in Images Using an Inception-like Autoencoder", Mar. 12, 2020, arXiv:2003.08731v1, pp. 1-15 (Year: 2020).*

(Continued)

*Primary Examiner* — David F Dunphy
(74) *Attorney, Agent, or Firm* — Banner & Witcoff, Ltd.

(57) ABSTRACT

Aspects of the disclosure relate to anomaly detection in cybersecurity training modules. A computing platform may receive information defining a training module. The computing platform may capture a plurality of screenshots corresponding to different permutations of the training module. The computing platform may input, into an auto-encoder, the plurality of screenshots corresponding to the different permutations of the training module, wherein inputting the plurality of screenshots corresponding to the different permutations of the training module causes the auto-encoder to output a reconstruction error value. The computing platform may execute an outlier detection algorithm on the reconstruction error value, which may cause the computing platform to identify an outlier permutation of the training module. The computing platform may generate a user interface comprising information identifying the outlier permutation of the training module. The computing platform may send the user interface to at least one user device.

20 Claims, 8 Drawing Sheets

Related U.S. Application Data

(60) Provisional application No. 63/040,770, filed on Jun. 18, 2020.

(51) Int. Cl.
  *G06V 10/778* (2022.01)
  *G06F 18/2433* (2023.01)
  *G06F 18/214* (2023.01)
  *G06F 18/21* (2023.01)
  *G06V 10/94* (2022.01)
  *H04L 9/40* (2022.01)

(52) U.S. Cl.
  CPC ........... *G06F 18/2433* (2023.01); *G06N 3/02* (2013.01); *G06V 10/95* (2022.01); *H04L 63/14* (2013.01)

(56) References Cited

U.S. PATENT DOCUMENTS

| | | |
|---|---|---|
| 2013/0083996 A1 | 4/2013 | Prasad et al. |
| 2019/0130279 A1 | 5/2019 | Beggel et al. |
| 2019/0324890 A1 | 10/2019 | Li et al. |

OTHER PUBLICATIONS

Oct. 27, 2021—(EP) Extended Search Report—App 21176499.8.
Sarajanovic-Djuikic et al, "Fast Distance-based Anomaly Detection in Images Using an Inception-like Autoencoder", Mar. 12, 2020, arXiv:2003.08731v,, pp. 1-15 (Year: 2020).

* cited by examiner

NEURAL NETWORK HOST PLATFORM FOR DETECTING ANOMALIES IN CYBERSECURITY MODULES

CROSS-REFERENCE TO RELATED APPLICATIONS

This application is a continuation of and claims priority to U.S. application Ser. No. 17/038,727, filed Sep. 30, 2020, and entitled, "Neural Network Host Platform for Detecting Anomalies in Cybersecurity Modules," which claims the benefit of and priority to U.S. Provisional Patent Application Ser. No. 63/040,770, filed Jun. 18, 2020, and entitled "Providing Test Automation and Uniformity Analysis," all of which are incorporated by reference herein in their entirety.

TECHNICAL FIELD

Aspects of the disclosure relate to data processing methods, machine learning systems, and communication systems and networks. In particular, one or more aspects of the disclosure relate to identifying anomalies in cybersecurity modules using machine learning.

BACKGROUND

Increasingly, organizations face various cybersecurity threats. Various modules may be developed to provide cybersecurity training to employees of these organizations so as to combat these threats. It remains difficult, however, to automatically achieve uniformity throughout different permutations of these modules. This is particularly true in circumstances where large numbers of permutations exist for each module. Undetected anomalies in these permutations may result in visual defects and/or other deficiencies that may cause poor user experiences. Attempts to integrate such analysis techniques into efficient and effective automated processes present various technical challenges, particularly when trying to balance module uniformity against the optimal consumption of computing resources, such as processing power and network bandwidth.

SUMMARY

Aspects of the disclosure provide technical solutions that overcome one or more of the technical problems described above and/or other technical challenges. For instance, one or more aspects of the disclosure relate to automatically identifying anomalies in cybersecurity training modules using machine learning.

In accordance with one or more embodiments, a computing platform having at least one processor, a communication interface, and memory may receive information defining a training module. The computing platform may capture a plurality of screenshots corresponding to different permutations of the training module. The computing platform may input, into an auto-encoder, the plurality of screenshots corresponding to the different permutations of the training module, which may cause the auto-encoder to output a reconstruction error value. The computing platform may execute, on the reconstruction error value, an outlier detection algorithm, which may cause the computing platform to identify an outlier permutation of the training module. The computing platform may generate a user interface comprising information identifying the outlier permutation of the training module. The computing platform may send the user interface to at least one user device.

In one or more instances, the auto-encoder may be trained on a set of images corresponding to a plurality of training modules including the training module. In one or more instances, the set of images may include images configured for one or more of: a desktop computer, a laptop computer, or a mobile device.

In one or more instances, the user interface may include controls allowing a user of the at least one user device to edit the outlier permutation of the training module. In one or more instances, the different permutations of the training module may correspond to one or more of: different languages, different browsers, or different resolutions.

In one or more instances, the computing platform may process, prior to inputting the plurality of screenshots into the auto-encoder, the plurality of screenshots, which may include redacting one or more of: text, images, or template components from each of the plurality of screenshots. In one or more instances, the computing platform may use the information defining the training module to render the different permutations of the training module.

In one or more instances, sending the user interface to the at least one user device may cause the at least one user device to display the user interface. In one or more instances, the user interface may include one or more of: an alphanumeric identifier for the outlier permutation of the training module, a link to access the outlier permutation of the training module, a summary of corrections to be made to the outlier permutation of the training module, an individual assigned to perform the corrections, or a status of the corrections.

In one or more instances, the reconstruction error value may indicate a degree to which the outlier permutation of the training module differs from an anticipated permutation of the training module. In one or more instances, the computing platform may identify the outlier permutation of the training module by: 1) identifying, using the outlier detection algorithm and the reconstruction error value, that the degree to which the outlier permutation of the training module differs from the anticipated permutation of the training module exceeds a predetermined anomaly identification threshold; and 2) based on the identification that the degree to which the outlier permutation of the training module differs from the anticipated permutation of the training module exceeds the predetermined anomaly identification threshold, identifying the outlier permutation of the training module.

In one or more instances, after sending the user interface to the at least one user device, the computing platform may receive user input indicating whether or not the outlier permutation of the training module was correctly identified as an outlier. Based on the user input indicating whether or not the outlier permutation of the training module was correctly identified as an outlier, the computing platform may dynamically tune the auto-encoder.

BRIEF DESCRIPTION OF THE DRAWINGS

The present disclosure is illustrated by way of example and not limited in the accompanying figures in which like reference numerals indicate similar elements and in which:

FIGS. 3 and 4 depict illustrative user interfaces for applying machine learning in anomaly detection in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

As a brief introduction to the concepts described further below, one or more aspects of the disclosure relate to systems and methods for automatically analyzing cybersecurity training modules to ensure uniformity. For example, many permutations of various training modules may be supported by an enterprise organization so as to configure each training module for various different languages, screen resolutions, browsers, and/or other parameters. Given all of these permutations, it may be difficult to ensure that all permutations of the modules are visually correct (e.g., that each permutation involves displaying the corresponding cybersecurity training module as it is intended to be displayed).

Accordingly, described herein is a machine learning tool that learns what the layout of each cybersecurity module should looks like, analyzes all corresponding permutations of each cybersecurity module, and flags identified anomalies for review and repair. In doing so, one or more of the systems and methods described herein solve technical problems corresponding to module scalability, overcome challenges (such as maintaining module uniformity) corresponding to visual testing, provide an improvement over alternative approaches to such uniformity analysis such as pixel to pixel comparison, and/or address additional technical deficiencies related to maintaining module uniformity.

Furthermore, one or more of the systems and methods described herein address deficiencies related to manual review of training modules. For example, it might not be feasible for a human to manually perform a regression test to all permutations of a set of training modules. For instance, there may be fifty different modules each produced for a plurality of locales, breakpoints, browsers, or other specified characteristics, and each module may contain tens or hundreds of pages. If such anomalies are not detected, the modules may suffer from visual defects that may result in a poor user experience (e.g., containing unreadable training information or other visual defects). In some instances, due to the volume of modules and variations thereof, locating these visual defects may be a time consuming and/or error prone process. Accordingly, by applying the techniques described herein, the process of anomaly detection may be streamlined for efficiency and increased accuracy, and a fast, low cost method for visual testing of modules may be provided.

Figure 1:
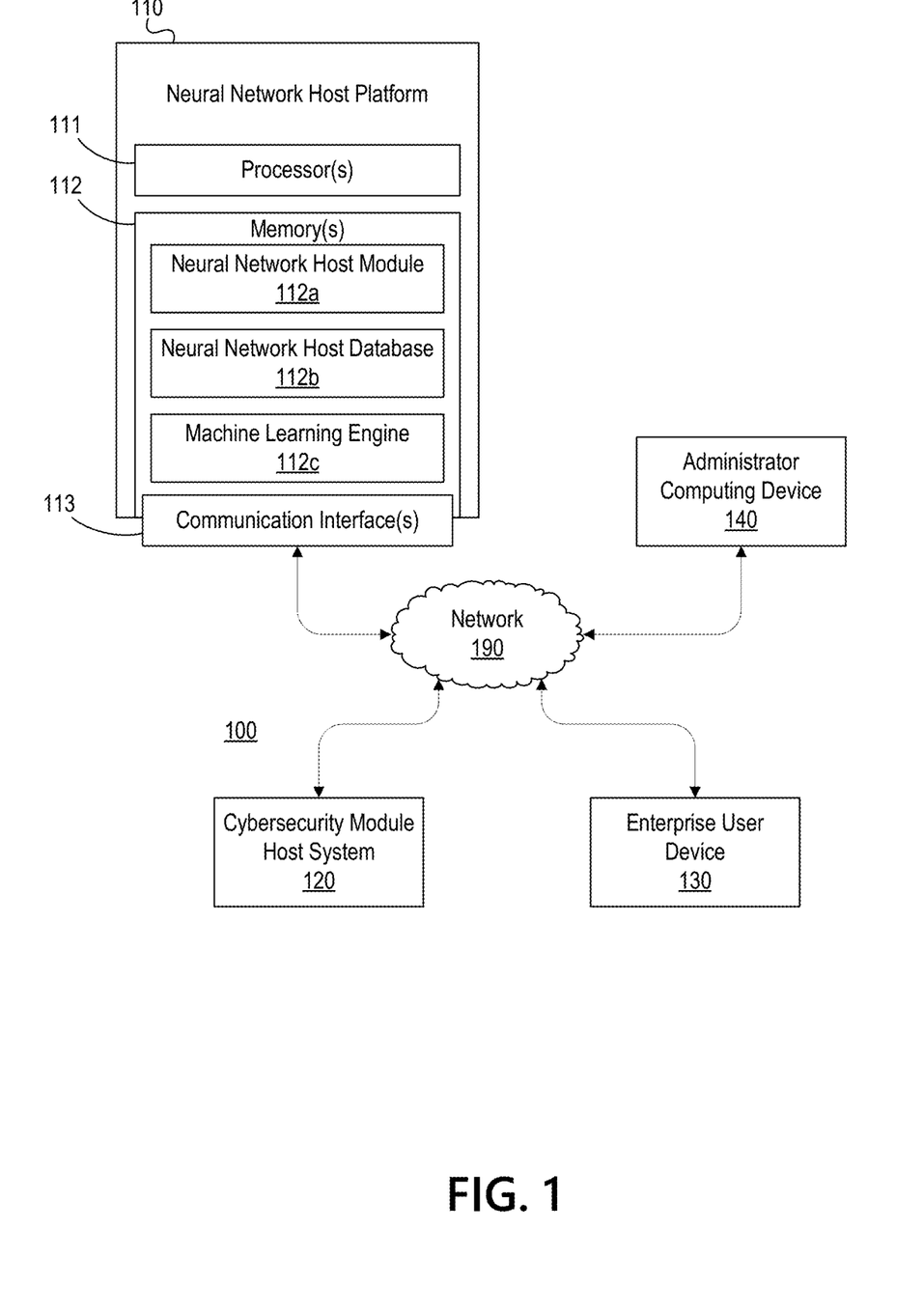
FIG. 1 depicts an illustrative operating environment for applying machine learning in anomaly detection in accordance with one or more example embodiments.

FIG. 1 depicts an illustrative operating environment for applying machine learning in anomaly detection in accordance with one or more example embodiments. Referring to FIG. 1, computing environment 100 may include various computer systems, computing devices, networks, and/or other operating infrastructure. For example, computing environment 100 may include a neural network host platform 110, cybersecurity module host system 120, enterprise user device 130, administrator computing device 140, and a network 190.

Network 190 may include one or more wired networks and/or one or more wireless networks that interconnect neural network host platform 110, cybersecurity module host system 120, enterprise user device 130, administrator computing device 140, and/or other computer systems and/or devices. In addition, each of neural network host platform 110, cybersecurity module host system 120, enterprise user device 130, administrator computing device 140 may be special purpose computing devices configured to perform specific functions, as illustrated in greater detail below, and may include specific computing components such as processors, memories, communication interfaces, and/or the like.

Neural network host platform 110 may include one or more processor(s) 111, one or more memory(s) 112, and one or more communication interface(s) 113. In some instances, neural network host platform 110 may be made up of a plurality of different computing devices, which may be distributed within a single data center or a plurality of different data centers. In these instances, the one or more processor(s) 111, one or more memory(s) 112, and one or more communication interface(s) 113 included in neural network host platform 110 may be part of and/or otherwise associated with the different computing devices that form neural network host platform 110.

In one or more arrangements, processor(s) 111 may control operations of neural network host platform 110. Memory(s) 112 may store instructions that, when executed by processor(s) 111, cause neural network host platform 110 to perform one or more functions, as discussed below. Communication interface(s) 113 may include one or more wired and/or wireless network interfaces, and communication interface(s) 113 may connect neural network host platform 110 to one or more networks (e.g., network 190) and/or enable neural network host platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause neural network host platform 110 to perform various functions) and/or databases (which may, e.g., store data used by neural network host platform 110 in performing various functions). For example, memory(s) 112 may store and/or otherwise provide neural network host module 112a, neural network host database 112b, and a machine learning engine 112c. In some instances, neural network host module 112a may store instructions that cause neural network host platform 110 to apply machine learning for anomaly detection, and/or execute one or more other functions described herein. Additionally, neural network host database 112b may store data that is used by neural network host platform 110 in applying machine learning for anomaly detection and/or in executing one or more other functions described herein. Furthermore, machine learning engine 112c may store instructions and/or data that may cause and/or be used by neural network host platform 110 to identify anomalies in cybersecurity training modules and/or execute one or more other functions described herein.

Cybersecurity module host system 120 may be and/or include one or more computing devices that may be configured to host one or more cybersecurity modules. For example, the cybersecurity module host system 120 may include one or more servers, server blades, or other devices configured for data storage. In some instances, in hosting the one or more cybersecurity modules, the cybersecurity module host system 120 may store one or more templates that may be used to generate various permutations of each cybersecurity module (e.g., based on language, device configuration, and/or other parameters).

Enterprise user device 130 may be configured to be used by a first user (who may e.g., be an employee of an enterprise organization). In some instances, enterprise user device 130 may be configured to present one or more user interfaces associated with cybersecurity training modules, receive input corresponding to user interactions with the cybersecurity training modules, and/or otherwise facilitate participation in cybersecurity training modules.

Administrator computing device 140 may be configured to be used by an administrative user (who may, e.g., be a network administrator and/or a cybersecurity analyst associated with an enterprise organization). Administrator computing device 140 may be configured to present one or more user interfaces associated with an operator dashboard, receive user input modifying training modules and/or templates for which an anomaly was detected, and/or otherwise facilitate monitoring and management of one or more systems and/or devices included in computing environment 100.

Figure 2A:
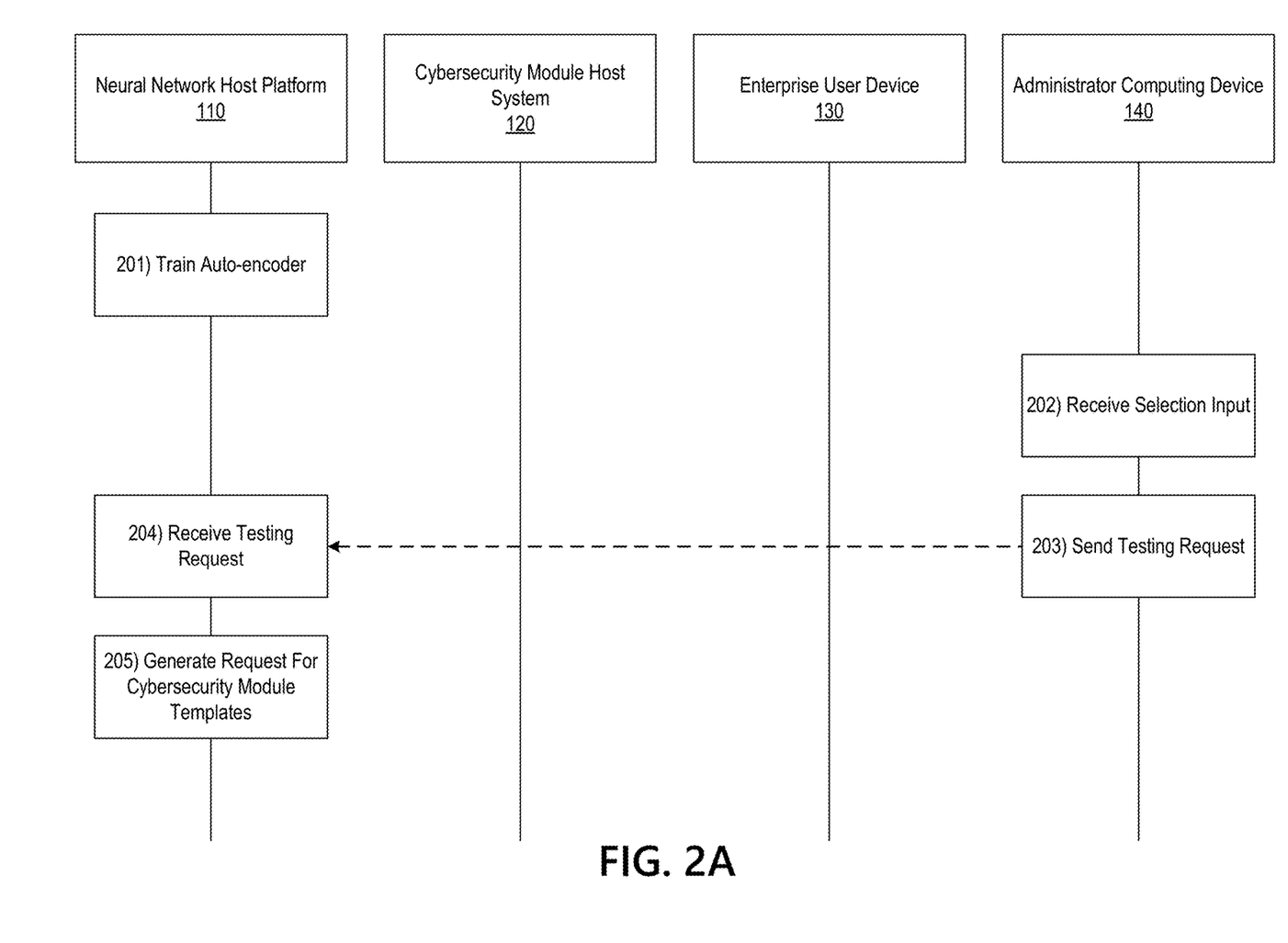
FIGS. 2A-2E depict an illustrative event sequence for applying machine learning in anomaly detection in accordance with one or more example embodiments.

FIGS. 2A-2E depict an illustrative event sequence for applying machine learning for anomaly detection in accordance with one or more example embodiments. Referring to FIG. 2A, at step 201, the neural network host platform 110 may train an auto-encoder to compute reconstruction error values. For example, the neural network host platform 110 may train the auto-encoder to compute values indicating a discrepancy between actual permutations of training modules (e.g., screenshots of permutations of the training modules, which may be generated by the neural network host platform 110) and anticipated permutations of the training modules (e.g., screenshots indicating what the permutations of the training modules should look like). To do so, the neural network host platform 110 may train the auto-encoder using one or more unsupervised learning techniques. In some instances, the neural network host platform 110 may use screenshots of cybersecurity module permutations configured for different computing devices (e.g., laptop computers, desktop computers, mobile devices, and/or other devices), different languages, different web browsers, different resolutions, and/or other configurable parameters/features to train the auto-encoder. In some instances, the neural network host platform 110 may use screenshots of entire cybersecurity module permutations and/or isolated visual components from cybersecurity module permutations to train the auto-encoder.

At step 202, the administrator computing device 140 may receive a selection input (e.g., from an administrative user and/or cybersecurity analyst operating the administrator computing device 140). In some instances, in receiving the selection input, the administrator computing device 140 may receive an input selecting one or more cybersecurity modules for testing (e.g., to be tested for anomalies in various pages of various permutations of the selected one or more cybersecurity modules). In some instances, the administrator computing device 140 may receive the selection input through one or more portals or other graphical user interfaces.

At step 203, administrator computing device 140 may send, share, or otherwise provide a testing request to the neural network host platform 110. For example, based on or in response to the selection input received at step 202, the administrator computing device 140 may send a request to the neural network host platform 110 to test (e.g., for uniformity) the selected one or more cybersecurity modules. In some instances, in sending the testing request, the neural network host platform 110 may send an identifier that may be used to identify the selected one or more training modules. Additionally or alternatively, the administrator computing device 140 may send one or more commands directing the neural network host platform to test the selected one or more cybersecurity modules.

At step 204, the neural network host platform 110 may receive or otherwise access the testing request from the administrator computing device 140 sent at step 203. In some instances, in receiving the testing request, the neural network host platform 110 may receive an identifier that may be used to identify the selected one or more training modules. Additionally or alternatively, the neural network host platform 110 may receive the one or more commands directing the neural network host platform 110 to test the selected one or more training modules.

At step 205, the neural network host platform 110 may generate a request for cybersecurity module templates and/or template information corresponding to the selected one or more cybersecurity modules (which were identified in the testing request received at step 204). For example, the neural network host platform 110 may generate a request to the cybersecurity module host system 120 to provide templates corresponding to the one or more selected cybersecurity modules. In some instances, the neural network host platform 110 may include the identifier of the selected one or more cybersecurity requests in the request. Additionally or alternatively, the neural network host platform 110 may send one or more commands directing the cybersecurity module host system 120 to provide the cybersecurity module templates.

Figure 2B:
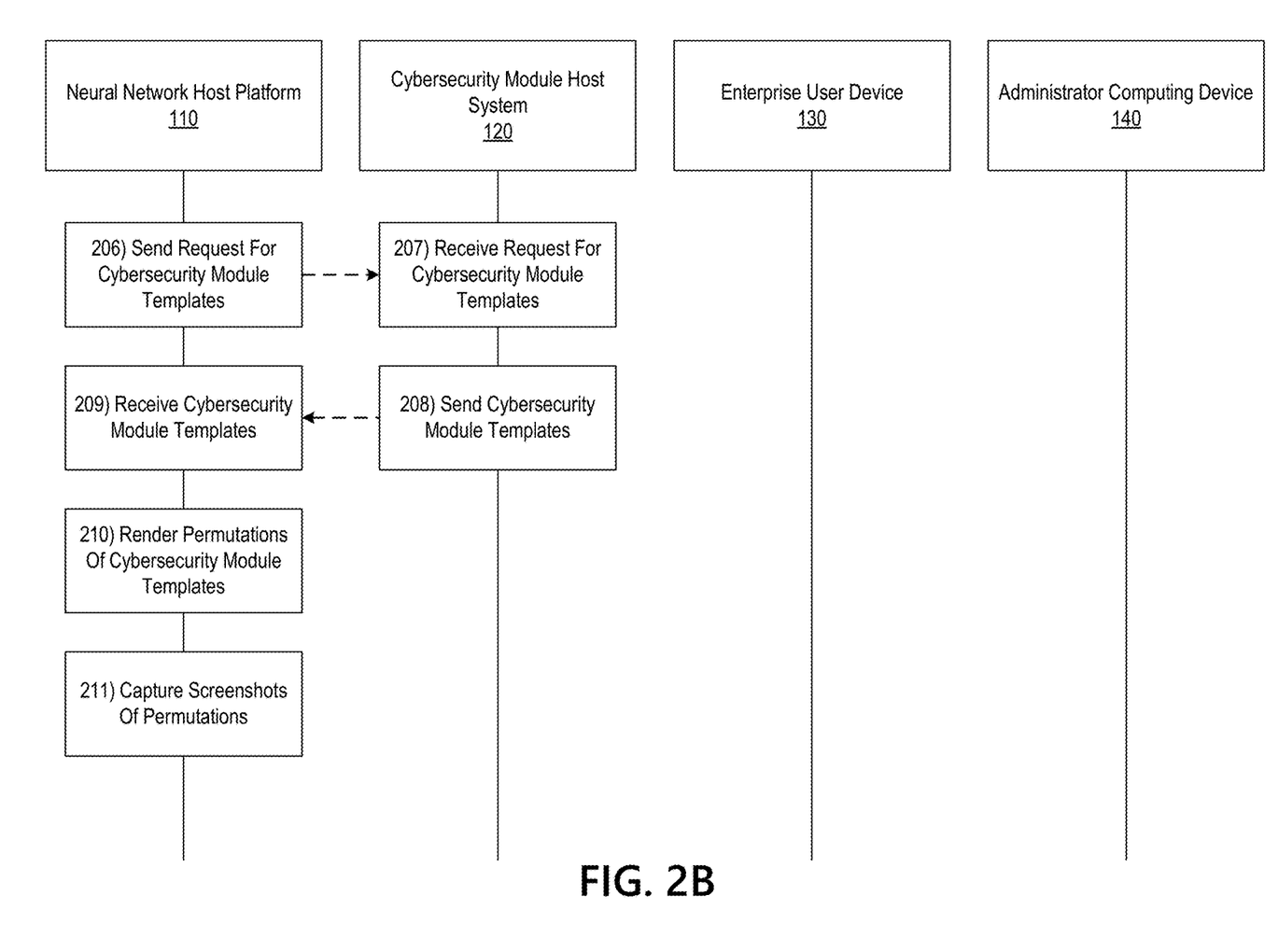

Referring to FIG. 2B, at step 206, the neural network host platform 110 may send, share, or otherwise provide the request for cybersecurity module templates and/or template information (generated at step 205) to the cybersecurity module host system 120. Additionally or alternatively, the neural network host platform 110 may send the one or more commands directing the cybersecurity module host system 120 to provide the cybersecurity module templates.

At step 207, the cybersecurity module host system 120 may receive or otherwise access the request for the cybersecurity module templates and/or template information, sent at step 206. Additionally or alternatively, the cybersecurity module host system 120 may receive the one or more commands directing the cybersecurity module host system 120 to provide the cybersecurity module templates.

At step 208, the cybersecurity module host system 120 may send, share, or otherwise provide the cybersecurity module templates and/or template information based on or in response to the request for the cybersecurity module templates received at step 207. For example, the cybersecurity module host system 120 may identify cybersecurity module templates, based on the identification information included in the request for the cybersecurity module templates, that may be used by the neural network host platform 110 to produce different permutations of the selected one or more cybersecurity training modules (e.g., information that may define the selected one or more cybersecurity modules).

At step 209, the neural network host platform 110 may receive or otherwise access the cybersecurity module templates and/or template information sent at step 208. For example, the neural network host platform 110 may receive the cybersecurity module templates corresponding to the selected one or more cybersecurity modules (e.g., information that may define the selected one or more cybersecurity modules).

At step 210, the neural network host platform 110 may render permutations of the selected one or more cybersecurity modules using the cybersecurity module templates and/or template information received at step 209. For example, the neural network host platform 110 may render permutations corresponding to versions of the selected one or more cybersecurity modules in various languages, configured for display at various devices (e.g., configured for particular devices, operating systems, or otherwise based on device parameters), configured for display in various browsers, and/or otherwise configured based on additional parameters. In doing so, the neural network host platform 110 may render each page of each of the selected one or more cybersecurity modules for each of the permutations. For example, the neural network host platform 110 may render, for each permutation, a plurality of pages that may be used by an enterprise user (e.g., user of enterprise user device 130) to progress through a cybersecurity module (e.g., one of the selected one or more cybersecurity modules). In some instances, the neural network host platform 110 may store each rendered permutation as well as distinct elements and/or other portions of each rendering. In some instances, the neural network host platform 110 may receive an input indicating visual elements, attributes, and/or other features of interest (e.g., from a system administrator) that should be distinctly stored. In these instances, the neural network host platform 110 may access information indicating these visual elements, attributes, and/or other features of interest, which may be manually coded and/or otherwise embedded into the selected one or more cybersecurity training modules.

At step 211, the neural network host platform 110 may capture screenshots for each of the permutations rendered at step 210. For example, the neural network host platform 110 may capture a screenshot for each page within each cybersecurity module for which permutations were rendered at step 210. As a particular example, the neural network host platform 110 may capture screenshots for each page of a "Security Essentials" training module that are each configured in a plurality of different languages, browser configurations, and/or other formats. In some instances, in capturing the screenshots, the neural network host platform 110 may capture a screenshot of a permutation and may crop out various reusable components. In these instances, the screenshots referred to in the proceeding steps may refer to these cropped components. In doing so, the neural network host platform 110 may model an entire training module/permutation and/or individual components that make up the training modules/permutations.

Figure 2C:
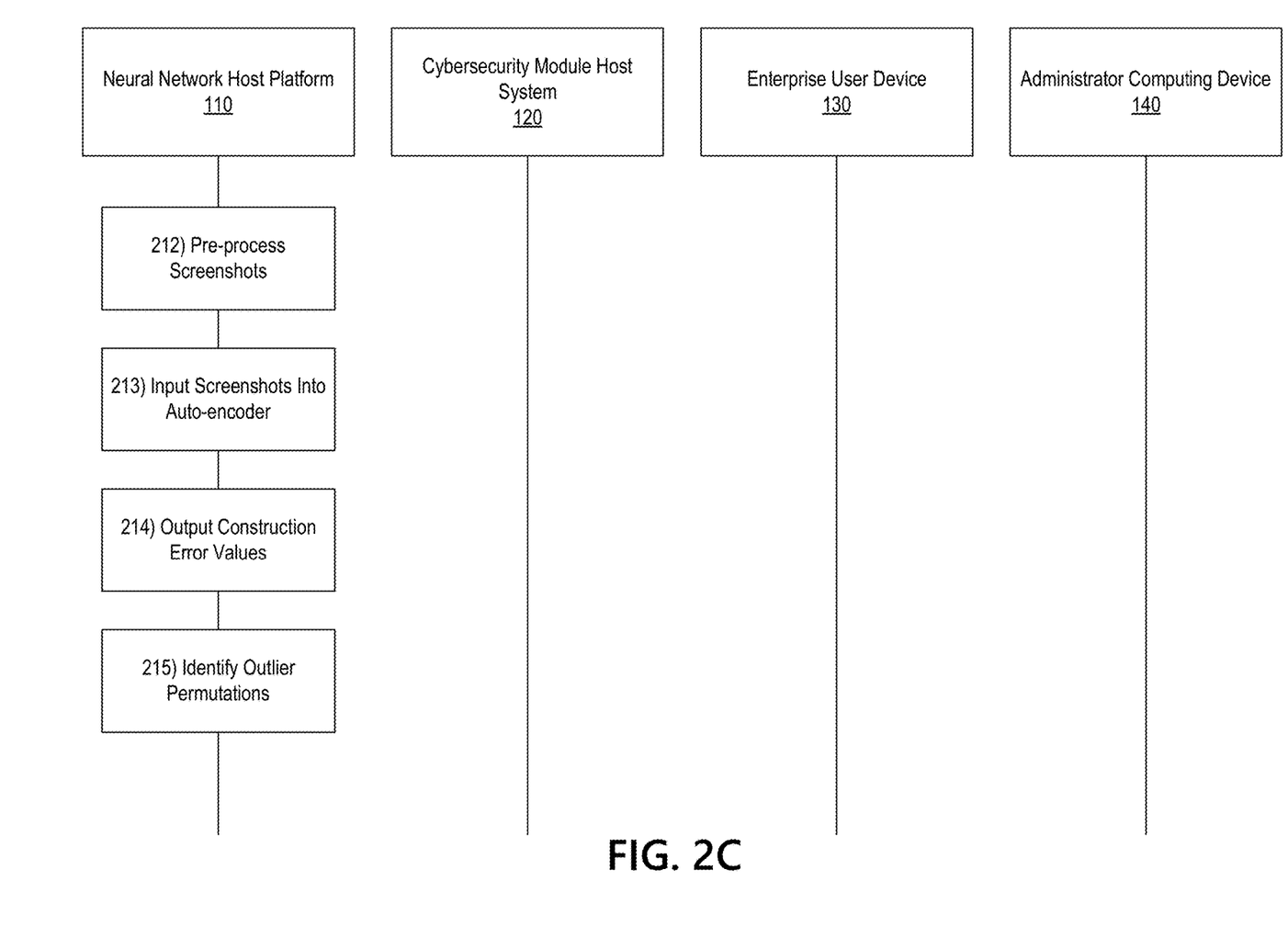

Referring to FIG. 2C, at step 212, the neural network host platform 110 may pre-process the screenshots captured at step 211. For example, the neural network host platform 110 may redact and/or otherwise mask text, images, and/or other components from each screenshot. In doing so, the neural network host platform 110 may improve identification of errors in visibility, size, positioning of specific elements, and/or other formatting errors. In some instances, the neural network host platform 110 may redact each type of visual component with a unique color (e.g., first color for text and a second color for images). Additionally or alternatively, the neural network host platform 110 may redact each visual component with a unique color, which may preserve parent/child element fields by apply a unique color to conceal both the parent element and the child element. In instances where the neural network host platform 110 redacts text from the screenshots, the neural network host platform 110 may improve effectiveness of layout uniformity testing across the various screenshots. In instances where the neural network host platform 110 redacts images from the screenshots, the neural network host platform may improve uniformity analysis of visibility, size, position, and/or other image properties for the screenshots. In instances where the neural network host platform 110 redacts other components, the neural network host platform 110 may improve layout uniformity analysis.

At step 213, the neural network host platform 110 may input the pre-processed screenshots into the auto-encoder trained at step 201. In some instances, the auto-encoder may be hosted by the neural network host platform 110 or another computing system with which the neural network host platform 110 is configured to communicate. In some instances, inputting the pre-processed screenshots into the auto-encoder may cause the neural network host platform 110 to output the reconstruction error values as described below at step 214.

At step 214, the neural network host platform 110 may use the auto-encoder to identify reconstruction error values for each screenshot. For example, the neural network host platform 110 may use the auto-encoder to compare the pre-processed screenshots to anticipated screenshots for a corresponding cybersecurity module (which may e.g., have been used to train the auto-encoder at step 201). Additionally or alternatively, the neural network host platform 110 may use the auto-encoder to compare the pre-processed screenshots to each other (e.g., identify a format discrepancy between a screenshot of a first permutation of a particular cybersecurity module and the corresponding screenshots for the remaining permutations of the particular cybersecurity module). In identifying these reconstruction error values, the neural network host platform 110 may use the auto-encoder to output error values indicating a degree of discrepancy between a captured screenshot of a cybersecurity module (e.g., which in some instances may be a screenshot of an outlier permutation of the cybersecurity module) and a model generated by the auto-encoder training process. In these instances, the neural network host platform 110 may identify lower reconstruction error values where the degree of discrepancy is lower and higher reconstruction error values where the degree of discrepancy is higher.

In some instances, in identifying the reconstruction error values, the neural network host platform 110 may assign a numeric value for each identified discrepancy. In some instances, the neural network host platform 110 may assign a consistent numeric value for each identified discrepancy. In other instances, the neural network host platform 110 may assign different numeric values for different discrepancies (e.g., first numeric value for misplaced element and second numeric value for incorrect element).

In some instances, the neural network host platform 110 may compare the reconstruction error values to a predetermined reconstruction error threshold. For reconstruction error values, identified by the neural network host platform 110 to be greater than the predetermined reconstruction error threshold, the neural network host platform 110 may proceed to step 215 to identify outlier permutations. For reconstruction error values, identified by the neural network host platform 110 to be less than or equal to the predetermined reconstruction error threshold, the neural network host platform 110 may proceed to step 224. In doing so, the neural network host platform 110 may effectively filter permutations for which the outlier detection algorithm does not need to be applied at step 215, which may conserve computing resources.

At step 215, the neural network host platform 110 may identify, based on the reconstruction error values output at step 214, one or more outlier permutations. In some instances, the neural network host platform 110 may identify the one or more outlier permutations by executing an outlier detection algorithm using the reconstruction error values. For example, the neural network host platform 110 may compute, based on the reconstruction error values corresponding to different permutations for a particular page of a particular cybersecurity module, a standard deviation for the particular page of the particular cybersecurity module. For example, the neural network host platform 110 may apply the following outlier detection algorithm:

$$\sigma = \sqrt{\frac{\sum (x_i - \mu)^2}{N}},$$

where $\sigma$ is the standard deviation, N is the number of permutations of the particular page of the particular cybersecurity module, $x_i$ is the reconstruction error value for each of the permutations of the particular page of the particular cybersecurity module, and $\mu$ is the mean reconstruction error value for the permutations of the particular page of the particular cybersecurity module.

In some instances, the neural network host platform 110 may compute the standard deviation on a page by page basis (e.g., compare corresponding pages of different permutations of the same cybersecurity module). Additionally or alternatively, the neural network host platform 110 may compute the standard deviation on an element by element basis (e.g., compare corresponding elements of corresponding pages of different permutations of the same cybersecurity module). In these instances, the neural network host platform 110 may use these element by element deviations to compute an overall standard deviation for the page (e.g., by averaging or otherwise combining the element by element standard deviations).

After computing this standard deviation, the neural network host platform 110 may compare the standard deviation to a predetermined outlier identification threshold. In this example, if the neural network host platform 110 determines that the standard deviation exceeds the predetermined outlier identification threshold, the neural network host platform 110 may determine that the particular page of the particular cybersecurity module includes at least one outlier permutation. For example, the neural network host platform 110 may determine that the corresponding cybersecurity module contains one or more anomalies, and should be updated to correct them. In these instances, the neural network host platform 110 may proceed to step 216. If the neural network host platform 110 determines that the standard deviation is less than or equal to the predetermined outlier identification threshold, the neural network host platform 110 may determine that the corresponding cybersecurity module does not include an outlier permutation. For example, the neural network host platform 110 may determine that the corresponding cybersecurity module does not need to be updated to correct anomalies (e.g., the anomalies are minimal and/or non-existent). In these instances, the event sequence may proceed to step 224. In some instances, in comparing the standard deviation to the predetermined outlier identification threshold, the neural network host platform 110 to a dynamic/variable threshold (e.g., the predetermined outlier identification threshold might not be a fixed value). In these instances, the neural network host platform 110 may use the predetermined outlier identification threshold to provide a "yes" or "no" determination for whether or not an outlier permutation is identified.

In some instances, in addition or as an alternative to comparing the standard deviation to the predetermined outlier identification threshold, the neural network host platform 110 may select a predetermined number of cybersecurity modules with the highest reconstruction error values (e.g., the cybersecurity modules with the ten (or some other predetermined number) highest reconstruction error values).

Figure 2D:
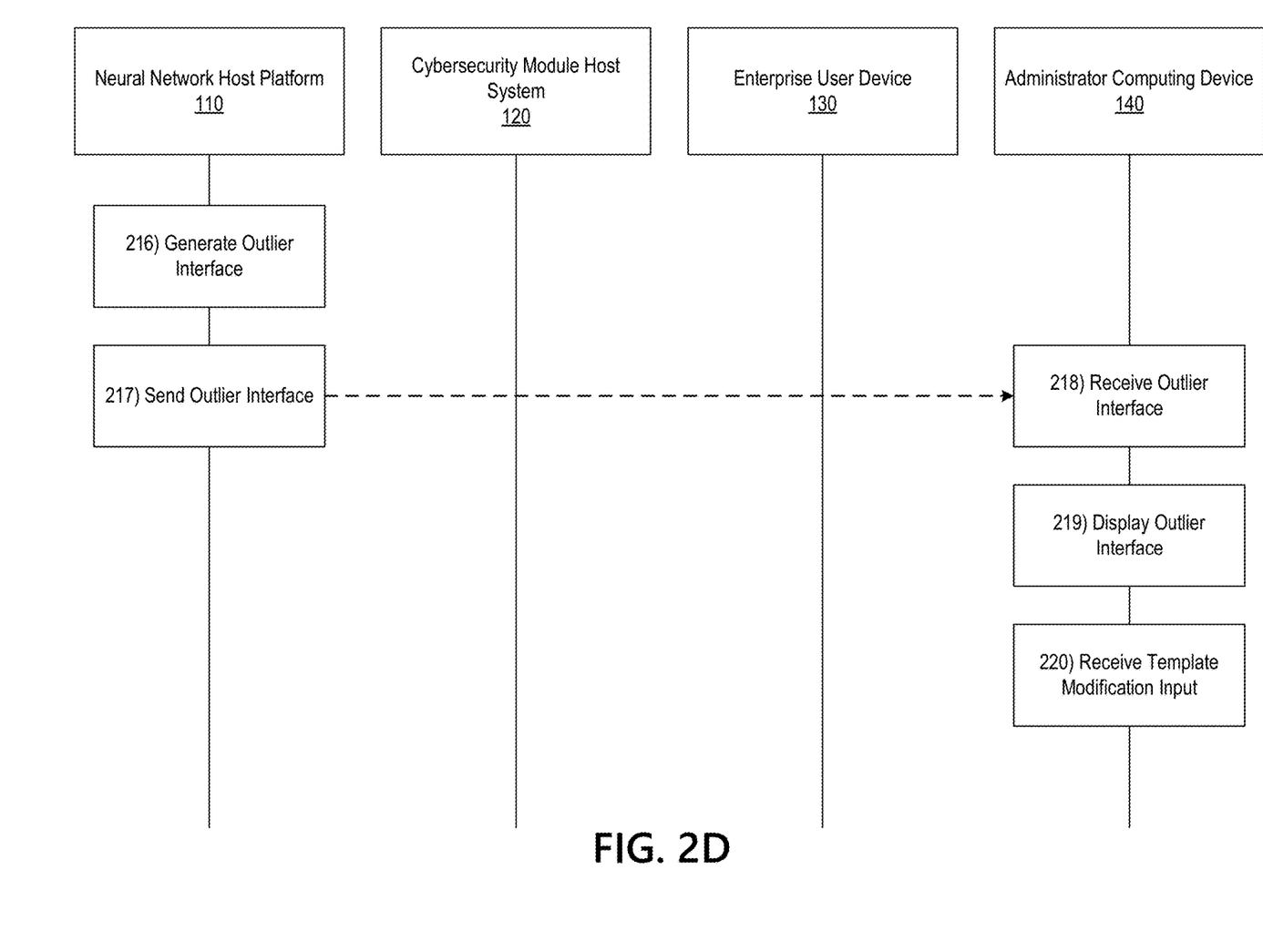

Referring to FIG. 2D, at step 216, the neural network host platform 110 may generate an outlier interface indicating any cybersecurity modules, identified at step 215, that should be updated or otherwise modified. In some instances, in generating the outlier interface, the neural network host platform 110 may generate an interface that may allow a user of the administrator computing device 140 to edit/correct outlier permutations identified at step 215.

At step 217, the neural network host platform 110 may send, share, or otherwise provide the outlier interface, generated at step 217, to the administrator computing device 140. At step 218, the administrator computing device 140 may receive or otherwise access the outlier interface, sent at step 217. At step 219, the administrator computing device 140 may display the outlier interface received at step 218. In some instances, sending the outlier interface at step 217 may cause the administrator computing device 140 to display the outlier interface at step 219. In some instances, in displaying the outlier interface, the administrator computing device 140 may display a graphical user interface similar to graphical user interface 300, which is shown in FIG. 3. For example, the administrator computing device 140 may display a graphical user interface that indicates, using for example a numeric identifier, alphabetic identifier, and/or alpha-numeric identifier, cybersecurity modules with detected anomalies, a specific page of the cybersecurity modules with the detected anomalies, and/or a specific permutation of the cybersecurity modules with the detected anomalies. Additionally or alternatively, the administrator computing device may display, on the graphical user interface, a summary of the anomaly, a summary of corrections to be made, a status of remedying the anomaly, an individual responsible for addressing the anomaly, and/or other information related to detected anomalies.

At step 220, the administrator computing device 140 may receive a template modification input (e.g., from a user of the administrator computing device 140). For example, the administrator computing device 140 may receive an input modifying one or more templates, corresponding to the cybersecurity modules for which anomalies were detected, that may be used to generate these cybersecurity modules and/or permutations of the cybersecurity modules. In some instances, in receiving the template modification input, the administrator computing device 140 may receive input recoding the cybersecurity modules. In these examples, the administrator computing device 140 may receive an input that may address the detected anomalies, and may result in uniformity between different permutations of each cybersecurity module for which anomalies were detected. In some instances, the administrator computing device 140 may receive an input indicating whether or not an identified outlier permutation was correctly identified as an outlier permutation. For example, the administrator computing device 140 may receive selection of a thumbs up or thumbs down icon, which may indicate that the identified outlier permutation was or was not correctly identified as an outlier permutation respectively. In these instances, the administrator computing device 140 may send feedback information to the neural network host platform 110, and the neural network host platform 110 may dynamically tune the auto-encoder based on the feedback information.

Figure 2E:
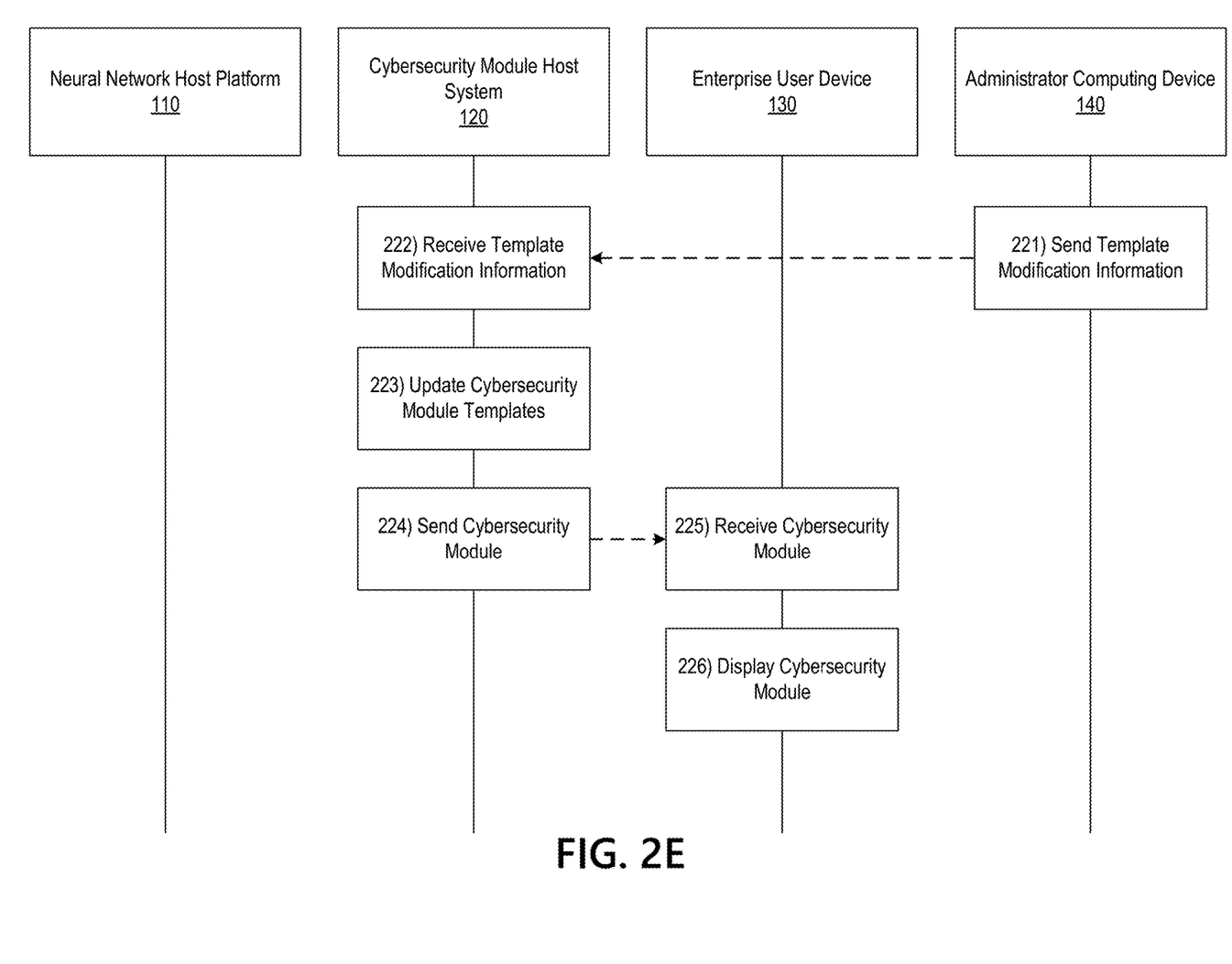

Referring to FIG. 2E, at step 221, the administrator computing device 140 may send, share, or otherwise provide a template modification information, based on the template modification input received at step 220, to the cybersecurity module host system 120. For example, the administrator computing device 140 may send information to the cybersecurity module host system 120 that may cause the cybersecurity module host system 120 to correct identified anomalies between corresponding pages of various renderings of stored cybersecurity modules.

At step 222, the cybersecurity module host system 120 may receive or otherwise access the template modification information sent at step 221. For example, the cybersecurity module host system 120 may receive information that may cause the cybersecurity module host system 120 to correct identified anomalies between corresponding pages of various renderings of stored cybersecurity modules.

At step 223, the cybersecurity module host system 120 may update cybersecurity module templates based on the template modification information received at step 222. For example, the cybersecurity module host system 120 may update stored cybersecurity module templates to address anomalies in identified outlier permutations (e.g., at steps 214-215).

At step 224, the cybersecurity module host system 120 may send, share, or otherwise provide a cybersecurity module to the enterprise user device 130. For example, the cybersecurity module host system 120 may send one of the cybersecurity modules for which a template was updated at step 223.

At step 225, the enterprise user device 130 may receive or otherwise access the cybersecurity module sent at step 224. For example, the enterprise user device 130 may receive a cybersecurity module for which a template was updated at step 223.

At step 226, the enterprise user device 130 may display the cybersecurity module received at step 226 (which may e.g., have been updated at step 223 to correct existing anomalies). For example, sending the cybersecurity module at step 224 may cause the enterprise user device 130 to display the cybersecurity module at step 226. In some instances, in displaying the cybersecurity module, the enterprise user device 130 may display a graphical user interface similar to graphical user interface 400, which is shown in FIG. 4. For example, the enterprise user device 130 may display a series of pages that a user of the enterprise user device 130 (e.g., an employee of an enterprise organization) may progress through to gain cybersecurity training (e.g., a security essentials module for executives of the enterprise organization, or other modules). In some instances, in displaying the cybersecurity module, the enterprise user device 130 may display a graphical user interface that prompts for feedback indicating whether or not the cybersecurity module includes any visible anomalies and/or other feedback. In these instances, the enterprise user device 130 may send any received feedback to the neural network host platform 110, and the neural network host platform 110 may use this feedback to dynamically tune the auto-encoder. Additionally or alternatively, the neural network host platform 110 may use the feedback to filter future results. For example, the neural network host platform 110 may effectively "mute" outliers identified as a non-issue by storing a hash of the corresponding screenshot and subsequently checking future anomaly hashes to identify whether or not the anomaly should be suppressed when reporting identified issues.

The steps described in the illustrative event sequence herein may be performed in any alternative sequence or order without departing from the scope of the disclosure. Furthermore, although the above described systems, event sequence, and methods are described primarily in the context of cybersecurity training, this is solely for illustrative purposes, and the systems, event sequence, and methods described herein may be applied in other contexts (e.g., maintaining uniformity/anomaly detection for any type of module(s), web page(s), user interface(s), and/or other displayable content) without departing from the scope of the disclosure. In some instances, these other contexts may include internal enterprise activities and/or external activities (e.g., outside of a particular enterprise organization). Furthermore, although the above described systems, event sequence, and methods are described in the context of internal cybersecurity training, the systems, event sequence, and methods described herein may be used to provide a software as a service (SaaS) visual testing service for localized pages corresponding to various other products without departing from the scope of the disclosure.

Figure 5:
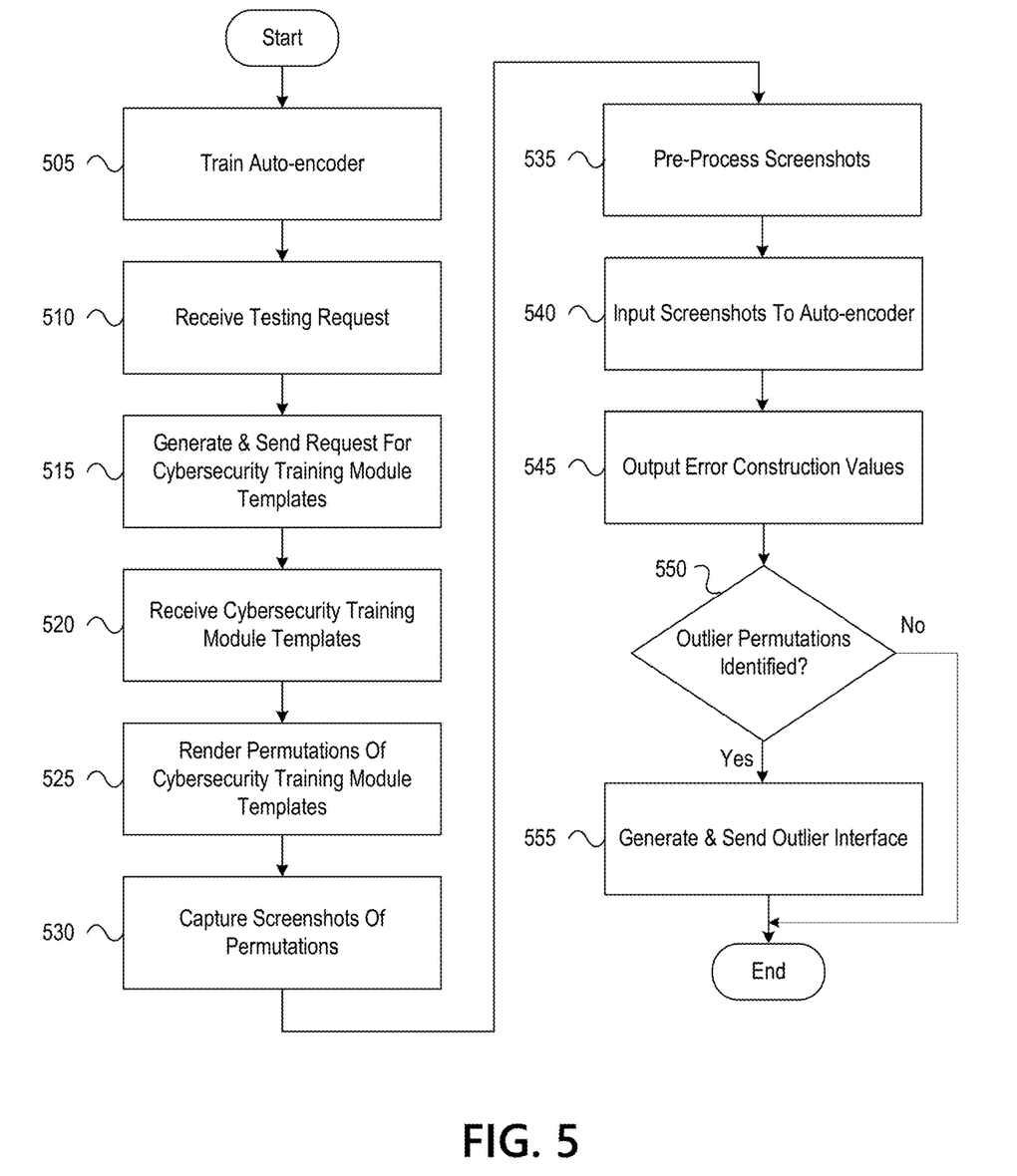
FIG. 5 depicts an illustrative method for applying machine learning in anomaly detection in accordance with one or more example embodiments.

FIG. 5 depicts an illustrative method for applying machine learning in anomaly detection in accordance with one or more example embodiments. Referring to FIG. 5, at step 505, a computing platform having at least one processor, a communication interface, and memory may train an auto-encoder for anomaly detection in cybersecurity modules. At step 510, the computing platform may receive a request to test one or more cybersecurity modules. At step 515, the computing platform may generate and send a request for cybersecurity templates corresponding to the one or more cybersecurity modules. At step 520, the computing platform may receive the cybersecurity training module templates. At step 525, the computing platform may render permutations of the cybersecurity training module templates. At step 530, the computing platform may capture screenshots for each page of each rendered permutation of the cybersecurity training module templates. At step 535, the computing platform may pre-process the screenshots captured at step 530. At step 540, the computing platform may input the screenshots into the auto-encoder. At step 545, the computing platform may use the auto-encoder to output reconstruction error values. At step 550, the computing platform may determine whether or not any of the reconstruction error values correspond to an outlier permutation. If the computing platform does not identify one or more outlier permutations, the method may end. If the computing platform does identify one or more outlier permutations, the computing platform may proceed to step 555. At step 555, the computing platform may generate and send an outlier interface to an administrator computing device.

It should be understood that the analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive information defining a training module;
   capture a plurality of screenshots corresponding to different permutations of the training module;
   pre-process each screenshot of the plurality of screenshots corresponding to different permutations of the training module;
   input, into an auto-encoder, the pre-processed screenshots corresponding to the different permutations of the training module, wherein inputting the pre-processed screenshots corresponding to the different permutations of the training module causes the auto-encoder to compare the pre-processed screenshots to anticipated screenshots for the training module to output a reconstruction error value;
   identify, based on the reconstruction error value, an outlier permutation of the training module;
   generate a user interface comprising information identifying the outlier permutation of the training module; and
   send the user interface to at least one user device.

2. The computing platform of claim 1, wherein the auto-encoder is trained on a set of images corresponding to a plurality of training modules including the training module.

3. The computing platform of claim 2, wherein the set of images includes images configured for one or more of: a desktop computer, a laptop computer, or a mobile device.

4. The computing platform of claim 1, wherein the user interface includes controls allowing a user of the at least one user device to edit the outlier permutation of the training module.

5. The computing platform of claim 1, wherein the different permutations of the training module correspond to one or more of: different languages, different browsers, or different resolutions.

6. The computing platform of claim 1, wherein pre-processing each screenshot of the plurality of screenshots comprises redacting one or more of: text, images, or template components from each of the plurality of screenshots.

7. The computing platform of claim 1, wherein the memory stores additional computer-readable instructions that, when executed by the at least one processor, cause the computing platform to:
   render, using the information defining the training module, the different permutations of the training module.

8. The computing platform of claim 1, wherein sending the user interface to the at least one user device causes the at least one user device to display the user interface.

9. The computing platform of claim 1, wherein the user interface includes one or more of: an alpha-numeric identifier for the outlier permutation of the training module, a link to access the outlier permutation of the training module, a summary of corrections to be made to the outlier permutation of the training module, an individual assigned to perform the corrections, or a status of the corrections.

10. The computing platform of claim 1, wherein the reconstruction error value indicates a degree to which the outlier permutation of the training module differs from an anticipated permutation of the training module.

11. The computing platform of claim 10, wherein identifying the outlier permutation of the training module comprises:
   identifying, using an outlier detection algorithm and the reconstruction error value, that the degree to which the outlier permutation of the training module differs from the anticipated permutation of the training module exceeds a predetermined anomaly identification threshold; and
   based on the identification that the degree to which the outlier permutation of the training module differs from the anticipated permutation of the training module exceeds the predetermined anomaly identification threshold, identifying the outlier permutation of the training module.

12. The computing platform of claim 1, wherein the memory stores additional computer-readable instructions that, when executed by the at least one processor, cause the computing platform to:
   receive, after sending the user interface to the at least one user device, user input indicating whether or not the outlier permutation of the training module was correctly identified as an outlier; and
   dynamically tune, based on the user input indicating whether or not the outlier permutation of the training module was correctly identified as an outlier, the auto-encoder.

13. A method comprising:
   at a computing platform comprising at least one processor, a communication interface, and memory:
      receiving, by the at least one processor, information defining a training module;
      capturing, by the at least one processor, a plurality of screenshots corresponding to different permutations of the training module;
      pre-process each screenshot of the plurality of screenshots corresponding to different permutations of the training module;
      inputting, by the at least one processor and into an auto-encoder, the pre-processed screenshots corresponding to the different permutations of the training module, wherein inputting the pre-processed screenshots corresponding to the different permutations of the training module causes the auto-encoder to compare the pre-processed screenshots to anticipated screenshots for the training module to output a reconstruction error value;
      identifying, by the at least one processor and based on the reconstruction error value, an outlier permutation of the training module;
      generating, by the at least one processor, a user interface comprising information identifying the outlier permutation of the training module; and
      sending, by the at least one processor, the user interface to at least one user device.

14. The method of claim 13, wherein the auto-encoder is trained on a set of images corresponding to a plurality of training modules including the training module.

15. The method of claim 14, wherein the set of images includes images configured for one or more of: a desktop computer, a laptop computer, or a mobile device.

16. The method of claim 13, wherein the user interface includes controls allowing a user of the at least one user device to edit the outlier permutation of the training module.

17. The method of claim 13, wherein the different permutations of the training module correspond to one or more of: different languages, different browsers, or different resolutions.

18. The method of claim 13, wherein pre-processing each screenshot of the plurality of screenshots comprises redacting one or more of: text, images, or template components from each of the plurality of screenshots.

19. The method of claim 13, further comprising:
   rendering, by the at least one processor and using the information defining the training module, the different permutations of the training module.

20. One or more non-transitory computer-readable media storing instructions that, when executed by a computing platform comprising at least one processor, a communication interface, and memory, cause the computing platform to:
   receive information defining a training module;
   capture a plurality of screenshots corresponding to different permutations of the training module;
   pre-process each screenshot of the plurality of screenshots corresponding to different permutations of the training module;
   input, into an auto-encoder, the pre-processed screenshots corresponding to the different permutations of the training module, wherein inputting the pre-processed screenshots corresponding to the different permutations of the training module causes the auto-encoder to compare the pre-processed screenshots to anticipated screenshots for the training module to output a reconstruction error value;
   identify, based on the reconstruction error value, an outlier permutation of the training module;
   generate a user interface comprising information identifying the outlier permutation of the training module; and
   send the user interface to at least one user device.

* * * * *